United States Patent [19]
Kersten et al.

[11] 3,866,421
[45] Feb. 18, 1975

[54] FLUIDIC CIRCUIT FOR A HYDROSTATIC TRANSMISSION

[75] Inventors: Günter Kersten; Hans-Jürgen Fricke, both of Stuttgart; Karl Veil, Uhingen, all of Germany

[73] Assignee: Robert Bosch GmbH, Stuttgart, Germany

[22] Filed: Sept. 13, 1973

[21] Appl. No.: 397,100

[30] Foreign Application Priority Data
Sept. 22, 1972 Germany............................ 2246638

[52] U.S. Cl................... 60/456, 60/464, 60/DIG. 5
[51] Int. Cl............................................ F16b 21/04
[58] Field of Search ............ 60/329, 453, 456, 464, 60/475, DIG. 5

[56] References Cited
UNITED STATES PATENTS
2,961,829  11/1960  Weisenbach..................... 60/456 X
3,230,699  1/1966  Hann et al. ...................... 60/456 X
3,236,049  2/1966  Reinke........................... 60/456 UX

*Primary Examiner*—Edgar W. Geoghegan
*Attorney, Agent, or Firm*—Michael S. Striker

[57] ABSTRACT

The high pressure conduit and the low pressure conduit of a hydrostatic transmission are connected by a flushing control valve provided with a discharge outlet into a low pressure area, and by a pressure limiting valve which permits at increased pressure in the high pressure conduit, fluid to flow therethrough so that the fluid flowing ouf of the pressure limiting valve is divided into a first flow part which is discharged by the control valve, and a second flow part entering the low pressure conduit at a point spaced from the point at which a priming pump discharges into the low pressure conduit. In this manner, only part of the hot fluid flows into the pump of the hydrostatic transmission while another part of the fluid is discharged into a discharge area, and displaced in the low pressure conduit means by cool fluid from the priming pump.

8 Claims, 3 Drawing Figures

FLUIDIC CIRCUIT FOR A HYDROSTATIC TRANSMISSION

BACKGROUND OF THE INVENTION

The present invention relates to a hydrostatic transmission in which the primary and secondary units are connected with each other by first and second conduits, one of which is a high pressure conduit and the other a low pressure conduit, depending on which of the machines operates as a pump and which as a hydraulic motor. Such arrangement requires pressure limiting valves in each conduit, since each conduit may serve as a high pressure conduit or as a low pressure conduit, depending on whether the primary or secondary hydraulic machine operates as a pump. Consequently, both conduits have to be protected against over-pressure by a pressure limiting valve.

In the known hydrostatic transmissions, the pressure limiting valves are provided in conduits which directly connect the main conduits of the transmission so that at overpressure in one main conduit, the high pressure conduit, the entire amount of fluid which passes through the pressure limiting valve, flows into the low pressure conduit. Due to the throttle effect of the pressure limiting valve, the pressure fluid is heated. Consequently heated fluid directly enters the low pressure conduit and the machine which operates as a pump. The cooled fluid supplied by the priming pump to the low pressure conduit, is under certain circumstances unable to maintain the temperature of the fluid at such a temperature that damage to the primary or secondary machines can be reliably prevented.

SUMMARY OF THE INVENTION

It is one object of the invention to provide a fluidic circuit for a hydrostatic transmission which overcomes the above-explained disadvantage of the prior art apparatus, and in which the temperature of the circulating fluid does not exceed a predetermined value during operation of the hydrostatic transmission.

Another object of the invention is to provide a hydrostatic transmission with a fluidic circuit which ensures a long span of life of the machine.

In accordance with the invention, pressure limiting valves are provided which are connected by a first connection with the low pressure conduit, and a second connection with a control valve which discharges into a low pressure area. The point where the first connection is connected with the low pressure conduit, is located between the hydraulic motor, and the point where the priming pump supplies fresh fluid to the low pressure conduit. In this manner, the result is obtained that the pressure fluid flowing through the pressure limiting valve is divided into a first flow part which directly flows into the low pressure conduit, and a second flow part which flows directly through the control valve into a reservoir in a low pressure area, where the fluid is cooled.

Such an arrangement is particularly suitable for radial piston machines of the type in which the rotor is mounted for rotation on a stationary control shaft having inlet and outlet control ports. Little play should be provided between the rotor and the control shaft. The hot fluid flowing from the low pressure conduit into a control port of the control shaft, would heat the same too much so that the control shaft expands and the play between control shaft and rotor is reduced in an unacceptable manner, unless the teaching of the present invention is applied. The fluidic circuit of the invention is inexpensive, and is advantageous for all types of hydrostatic machines.

The arrangement of the invention is particularly suited for hydrostatic transmissions for propelling a motorcar. The transmission is cooled not only during normal forward driving, but also during reverse driving and when the car rolls downward due to its own weight.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
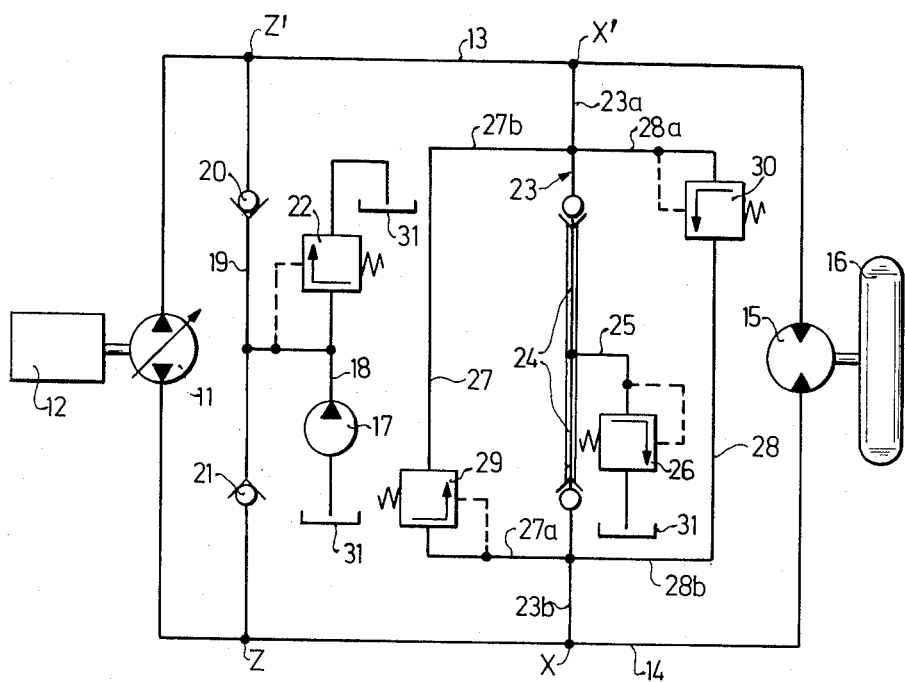
FIG. 1 is a schematic diagram illustrating a fluidic circuit according to the invention.

Referring first to FIG. 1 which schematically shows the hydraulic circuit of the invention, an adjustable hydrostatic pump 11 is driven by a prime mover 12 and is connected by first and second main conduits, namely, the high pressure conduit 13 and the low pressure conduit 14, with a hydraulic motor 15 which drives, for example, the wheel 16 of a motorcar. The hydrostatic transmission 11 to 14 can be reversed so that the hydraulic machine 15 operates as a pump driven by the wheel 16, and the hydraulic machine 11 operates as a motor so that the conduit 13 is the low pressure conduit, and the conduit 14 the high pressure conduit.

A priming pump 17, which draws fluid from a low pressure space 31, has an outlet connected by a conduit 18 with a conduit 19 connecting the high pressure and low pressure conduits 13, 14, and containing oppositely arranged check valves 20, 21 which open toward the high pressure and low pressure conduits 13, 14 so that when conduit 13 is the high pressure conduit, the fluid delivered by the priming pump 17 flows through check valve 21 into the low pressure conduit 14 at a first point Z, and is supplied to the intake of the main pump 11.

A spring biassed, pressure limiting valve 22 is connected with the outlet conduit 18 of the priming pump 17, and discharges into a low pressure space 31 when the pressure in conduit 18 becomes too high.

A conduit 23 includes a conduit portion 23a connected at the point X' with the high pressure conduit 13, and a portion 23b connected at the point X with the low pressure conduit 14. A flushing control valve 24, which substantially operates with two check valves controlling discharge through a conduit 25 and a spring biassed pressure maintaining valve 26 into a low pressure discharge space 31.

A conduit 28 including a pressure limiting valve 30, has conduit portions 28a and 28b upstream and downstream of the pressure limiting valve 30, and bypasses the flushing control valve 24 since conduit portion 28a is connected by conduit portion 23a with the point X', and conduit portion 28b is connected by conduit portion 23b with the point X. Point X is located between the point Z where the priming pump 17 discharges into the low pressure conduit 14, and the hydraulic motor 15. Point X' is correspondingly located between the point Z' and the hydraulic motor 15.

Points X' and X, and conduits 28a and 28b, are also connected with conduits 27a and 27b of a conduit 27 including a spring loaded pressure limiting valve 29, corresponding to valve 30. The arrangement is such that when the high pressure prevails in conduit 13, pressure limiting valve 30 is operative, and when the high pressure prevails in conduit 14, pressure limiting valve 29 is operative. The points Z and Z' are located upstream of the points X, X' with reference to the flow of the priming pump 17.

Figure 2:
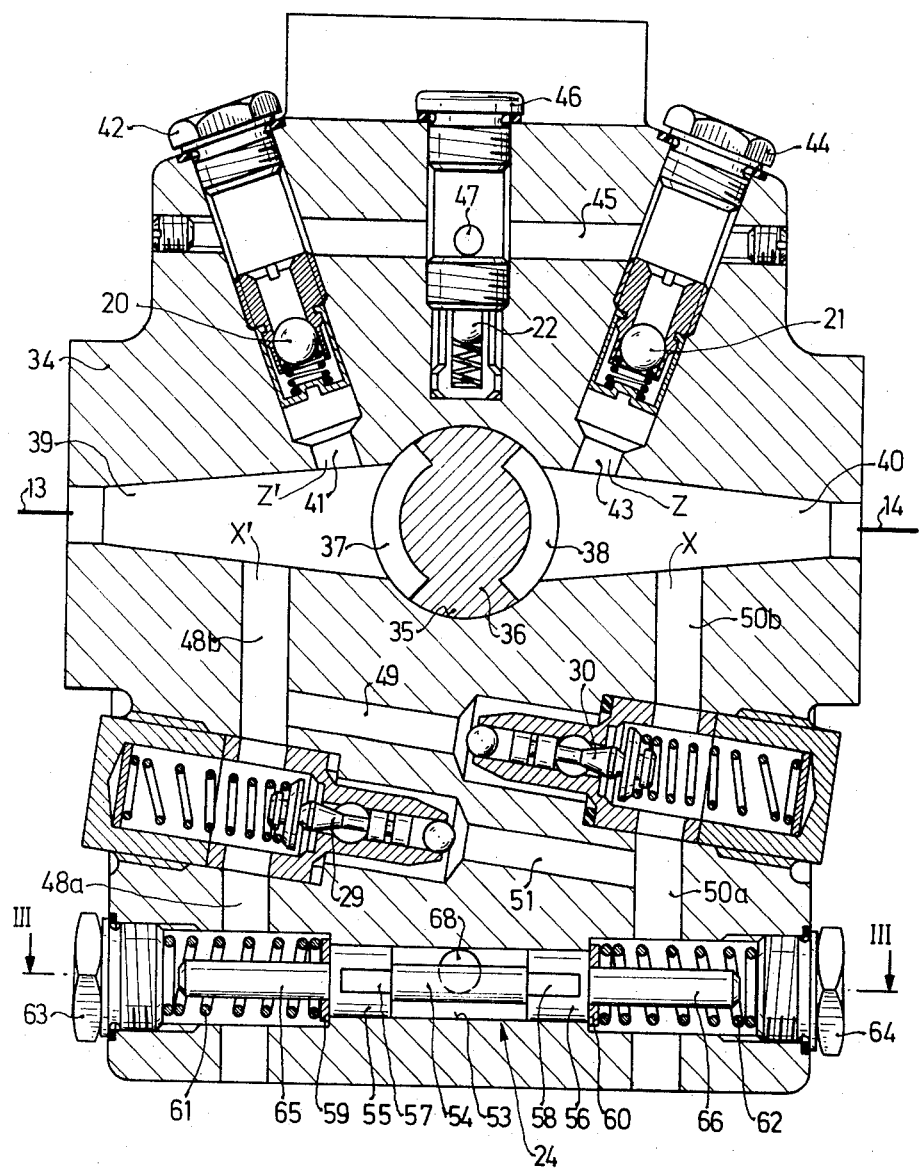
FIG. 2 is a cross-sectional view of a housing block used for a hydraulic machine suitable for operation in a hydrostatic transmission, and particularly illustrates the placing of several valves in the housing block.

In the preferred embodiment of the invention illustrated in FIG. 2, the above-described conduits are passages, channels, or ducts in the housing block 34, and the valves 20, 21, 22, 29, 30, 24 are mounted in bores of housing block 34. Housing block 34 is preferably a stationary part of a rotary main pump 11.

In a central bore 35, a stationary shaft 36 is mounted which has circumferentially extending high pressure and low pressure ports 37, 38 opening into high pressure and low pressure channels 39, 40 which are diametrically arranged and communicate with high pressure and low pressure conduits 13 and 14 as schematically indicated in FIG. 2.

A rotor, not shown, is mounted with little play on the control shaft 36, and has contracting and expanding working chambers communicating with control ports 37 and 38. The machine is preferably a radial piston machine in which the pistons are reciprocated by an eccentric endless cam surface.

Channel 40 is connected at the point Z with a bore 43, and channel 39 at the point Z' with a bore 41. Check valves 21 and 20 are mounted in bores 43 and 41. Threaded plugs 42 and 44 close the check valves 20 and 21 which have a common outlet passage 45, corresponding to conduit 19 in FIG. 1. Passage 45 is connected with another passage 47, corresponding to conduit 18, and is connected with the outlet of the priming pump 17. The passage 45 contains the pressure limiting valve 22.

High pressure channel 39 communicates at a point X' with a passage 48b, and low pressure passage 40 communicates at the point X with a passage 50b. Passages 48b and 50b communicate with pressure limiting valves 30 and 29. A passage 49 connects passage 48b with the pressure limiting valve 30, and corresponds to conduit portions 23a and 28a. The pressure limiting valve 29 communicates with the passage 51 which ends in a passage 50a opening into a flushing control valve 24. A passage 48a connects the pressure limiting valve 29 with the flushing control valve 24. Passages 48a and 50a correspond to conduits 27a and 28a.

Figure 3:
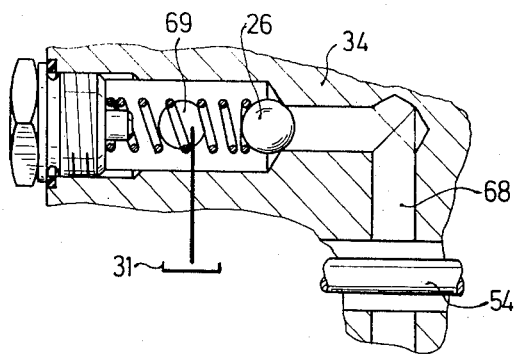
FIG. 3 is a fragmentary sectional view taken on line III—III in FIG. 2.

Passages 48a and 50a open into a stepped bore 53 which penetrates the housing block 34, and which mounts the control slide 54 of the control valve 24. Control slide 54 has two valve pistons 55, 56 provided with recesses 57, 58. Pressure springs 61, 62 abut spring discs 59, 66 which abut shoulders of the bore 53. The ends of the springs 61, 62 abut the closure plugs 63, 64 which are adjustable. Stems 65, 66 are provided at the ends of the valve slide 54, 55, 56, and limit the movement of the valve slides in two end positions determined by the adjustment of plugs 63, 64. A transverse bore 68, best seen in FIG. 3, is connected with the pressure maintaining valve 26 which has a discharge conduit 69 which opens into the low pressure discharge space 31. Passage 68 consisting of two transverse bores, corresponds to conduit 25 shown in FIG. 1.

As is apparent from FIG. 2, the points Z' and Z where passages 41, 43 open into high pressure and low pressure channels 39, 40, are located between the control shaft 36, and the points X', X where the passages 48b and 50b are connected with the high pressure and low pressure channels 39, 40.

The hydrostatic transmission described above operates as follows:

Assuming that the primary machine 11 operates as a pump and pumps fluid into the main conduit 13, so that main conduit 13 is the high pressure conduit, the fluid in high pressure conduit 13 rotates the hydraulic motor 15 so that low pressure fluid flows through the low pressure conduit 14 back to the main pump 11.

The priming pump 17 pumps pressure fluid into the conduits 18 and 19 and the open check valve 21 in cool condition out of the low pressure discharge space, such as the reservoir 31 and into point Z of the low pressure conduit 14. Check valve 20 is closed by the high pressure prevailing in the high pressure conduit 13. All cooled fluid pumped by the priming pump 17 enters the low pressure conduit 14 and the low pressure working chambers of the hydraulic machines 11 and 15. In this manner, leakage losses are compensated, and cool pressure fluid enters the low pressure conduits.

The high pressure in the high pressure conduit 13 operates the flushing control valve 24 so that a part of the hot pressure fluid flowing in the low pressure conduit 14 can flow through conduits 23b, flushing control valve 24, discharge conduit 25 and pressure maintaining valve 26 into the low pressure reservoir 31, and is not directly returned to the main pump 11.

Referring to FIG. 2, the valve slide 54 is pressed against the action of spring 62 to the right as viewed in FIG. 2 so that pressure fluid flowing through passage 50a can flow through grooves 58 into space between valve pistons 55 and 56 and through passage 68 through the pressure maintaining valve 26 which is normally closed, as shown in FIG. 3. The entire output volume of the priming pump 17 enters the low pressure conduit 14 and compensates leakage losses, while cooled pressure fluid is fed into the low pressure conduit 14 and the expanding working chambers of the hydraulic machines 11 and 15.

In the event that the pressure in high pressure conduit 13 rises above a permissible pressure to which the pressure limiting valve 30 is adjusted, the pressure limiting valve 30 opens, and pressure fluid flows through conduit portion 28b to conduit portion 23b and the point X where it mixes with the cool pressure fluid pumped by priming pump 17 into low pressure conduit 14.

A part of the pressure fluid in conduit 28b flows through the flushing control valve 24 and the pressure maintaining valve 26, which opens, into the discharge reservoir 31, while a second part flows through conduit portion 23b into the low pressure conduit 14 at the point X.

It follows that only a part of the pressure fluid discharged from the pressure limiting valve 30, flows into the low pressure conduit 14. This is of particular importance, since the pressure fluid is highly heated when flowing through the pressure limiting valve 30.

In the downstream conduit portion 28b very hot pressure fluid flows when the pressure limiting valve 30 opens due to excess pressure in high pressure conduit 13. If this hot pressure fluid is permitted to flow completely into the low pressure conduit 14, which is the arrangement of the prior art, the pressure fluid would become very hot in the low pressure conduit 14, which may cause damage to the pump 11 which could be overheated.

In accordance with the invention, this detrimental effect is avoided, since only a part of the hot fluid discharged from pressure limiting valve 30 into the downstream conduit portion 28b, flows directly into the low pressure conduit 14, while another part flows into the low pressure container 31 due to the fact that the pressure maintaining valve 26 opens and permits discharge of the hot pressure fluid into the low pressure discharge space 31 where it is cooled. This second part of the flow is replaced in the low pressure conduit 14 by the cooled fluid pumped by the priming pump 17 at the point Z into the low pressure conduit 14.

Referring again to FIG. 2, high pressure prevails in the channel 39, and consequently also in passages 48b and 49 so that high pressure acts on the pressure limiting valve 30. When this valve opens due to high pressure in high pressure conduit 13, as explained above, pressure fluid flows out of the outlet of pressure limiting valve 30, partly through passage portion 50b into the low pressure channel 40, and partly through passage 502 into the bore 53 of the control valve 24, which is in the open condition in which fluid can flow through grooves 58 into the transverse bore 68. Due to the high pressure in bore or passage 68, the pressure maintaining valve 26 opens so that fluid is discharged through the outlet bore 69 into the low pressure reservoir 31.

If the above-described hydrostatic transmission is used for driving the wheels 16 of a motorcar, it may happen that the car, rolling downhill, is accelerated by its mass, and drives the secondary machine 15 at such a speed that the machine 15, normally operating a hydraulic motor, starts to operate as a pump, whose power is consumed by the drag torque of the machine 12. As a result, conduit 14 becomes the high pressure conduit, and conduit 13 becomes the low pressure conduit. It is apparent that the operation takes place as described above for the normal condition, with the exception that instead of pressure limiting valve 30, the pressure limiting valve 29, which is connected by conduit portions 27a and 27b to the points X, X', becomes effective. The priming pump 7 pumps cooled fluid into the now low pressure conduit 13 at the point Z' through the opening check valve 20. The slide 54 of the flushing control valve 24 is shifted against the action of spring 61 to the left so that pressure fluid from passage 48a can flow through the groove 57 into the bore 68 to the pressure maintaining valve 26.

If in conduit 14, which is now the high pressure conduit, the pressure rises above the limit permitted by the pressure limiting valve 29, the same opens and pressure fluid flows through conduit portion 27b of conduit 27 partly into the low pressure conduit 13, and partly through the flushing control valve 24 and the pressure maintaining valve 26 to the low pressure rerevroir 31.

Referring to FIG. 2, under such circumstances, the high pressure, now prevailing in passages 50a and 51, opens the pressure limiting valve 29, and pressure fluid partly flows through passage 48b and partly through passage 48a to a discharge space.

During braking of a car whose wheels 16 are driven, the pressure conditions in conduits 13 and 14 may also be reversed. The apparatus functions then as described above.

It will be understood that each of the elements described above, or two or more together, may also find a useful application in other types of hydrostatic transmissions differing from the types described above.

While the invention has been illustrated and described as embodied in a fluidic circuit for a hydrostatic transmission preventing overheating of the circulating fluid, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning of range of equivalence of the following claims.

What is claimed as new and desired to be protected by Letters Patent is set forth in the appended claims.

We claim:

1. In a hydrostatic transmission including a main pump, a hydraulic motor, a high pressure conduit means and a low pressure conduit means, in combination, a fluidic circuit comprising priming pump means having an outlet means connected with a first point of said low pressure conduit means; at least one pressure limiting valve having an inlet conduit connected with said high pressure conduit means and an outlet conduit connected with a second point of said low pressure conduit means located between said hydraulic motor and said first point; and a flushing control valve means connecting said inlet conduit and outlet conduit and having discharge means for discharging into a low pressure area so that when increased pressure in said high pressure conduit means opens said pressure limiting valve, and fluid heated in said pressure limiting valve flows into said outlet conduit, a first part of said heated fluid flows through said flushing control valve means and said discharge means into the low pressure area, and a second part of said heated fluid flows at said second point into said low pressure conduit means to mix with cool fluid discharged from said priming pump means at said first point.

2. A fluidic circuit as claimed in claim 1 wherein said discharge means includes a pressure maintaining valve between said flushing control valve means and said discharge area.

3. A fluidic circuit as claimed in claim 1 wherein said priming pump means include a priming pump, pressure limiting valve means, and check valve means.

4. In a hydrostatic transmission including first and second hydraulic machines, and first and second conduit means, one of which serves as a high pressure conduit means and the other of which serves as a low pressure conduit means, in combination, a fluidic circuit comprising priming pump means including a priming pump and first and second check valves connecting said priming pump with first points of said first and second conduit means; first and second pressure limiting valves having inlet conduits connected with the respective high pressure conduit means and outlet conduits connected with a second point of the respective low pressure conduit means between the machine serving as hydraulic motor and the respective first point; and a flushing control valve means connecting said inlet conduits and said outlet conduits and having discharge means for discharging into a low pressure area so that when increased pressure in the respective high pressure conduit means opens the respective pressure limiting valve and fluid heated in the respective pressure limiting valve flows into the respective outlet conduit means, a first part of said heated fluid flows through said flushing control valve means and said discharge means into said low pressure area, and a second part of said heated fluid flows at said second point into the respective low pressure conduit means to mix with cool fluid discharged from said priming pump means at said first point of the respective low pressure conduit means.

5. A fluidic circuit as claimed in claim 4 wherein said discharge means include a pressure maintaining valve between said flushing control valve means and said discharge area.

6. A fluidic circuit as claimed in claim 4 wherein at least one of said hydraulic machines comprises a housing block having a central bore, and a control shaft mounted in said central bore and having high pressure and low pressure ports; wherein said housing block has diametrically arranged high pressure and low pressure channels communicating with said high pressure and low pressure ports and forming said high pressure and low pressure conduit means; wherein said housing block has valve bores opening into said high pressure and low pressure channels at said first points; wherein said check valves are located in said valve bores, respectively; wherein said housing block has passages connecting said check valves with said priming pump; wherein said first and second pressure limiting valves and said flushing control valve are mounted in said housing block; wherein said housing block has passages connecting each pressure limiting valve with said flushing control valve, and other passages connecting said pressure limiting valves with said high pressure and low pressure channels at said second points.

7. Fluidic circuit as claimed in claim 6 wherein said discharge means include a pressure maintaining valve mounted in said housing block and having a discharge outlet into a low pressure area; and wherein said housing block includes a discharge passage connecting said flushing control valve with said pressure maintaining valve.

8. Fluidic circuit as claimed in claim 6 wherein said priming pump means include pressure limiting valve means located in said housing block between said valve bores and check valves; and wherein said housing block has a passage connecting said check valves and said pressure limiting valve means with a bore adapted to be connected with the outlet of said priming pump.

* * * * *